(12) United States Patent
Umetsu et al.

(10) Patent No.: US 6,374,056 B1
(45) Date of Patent: Apr. 16, 2002

(54) CAMERA WITH MAGNETIC RECORDING DEVICE

(75) Inventors: Takao Umetsu; Minoru Ishiguro; Junichi Iwamoto, all of Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/527,235

(22) Filed: Mar. 16, 2000

(30) Foreign Application Priority Data

Mar. 19, 1999 (JP) ............................................ 11-075517

(51) Int. Cl.⁷ ............................................... G03B 17/24
(52) U.S. Cl. ......................... 396/299; 396/319; 396/543
(58) Field of Search ................................. 396/310, 311, 396/319, 312, 313, 296, 297, 299, 543

(56) References Cited

U.S. PATENT DOCUMENTS

| | | | |
|---|---|---|---|
| 4,483,601 A | * 11/1984 | Sekida et al. | 396/299 |
| 5,302,990 A | * 4/1994 | Satoh et al. | 396/292 |
| 5,682,458 A | * 10/1997 | Funazaki | 386/128 |
| 5,691,580 A | * 11/1997 | Shelby | 307/119 |
| 5,815,760 A | * 9/1998 | Ito et al. | 396/543 |
| 5,845,166 A | * 12/1998 | Fellegara et al. | 396/429 |
| 5,893,000 A | 4/1999 | Iwai et al. | |
| 5,897,228 A | * 4/1999 | Schrock | 396/297 |
| 5,966,671 A | * 10/1999 | Mitchell et al. | 355/575 |
| 5,970,261 A | 10/1999 | Ishiguro et al. | |
| 6,134,392 A | * 10/2000 | Gove | 396/296 |
| 6,164,839 A | * 12/2000 | Watanabe | 396/292 |

FOREIGN PATENT DOCUMENTS

| | | | |
|---|---|---|---|
| JP | 9-211677 | 8/1997 | |
| JP | 9-211678 | 8/1997 | |
| JP | 10-142650 | 5/1998 | |
| JP | 10-142651 | 5/1998 | |
| JP | 10142651 A | * 5/1998 | ............ G03B/7/00 |

* cited by examiner

Primary Examiner—David M. Gray
(74) Attorney, Agent, or Firm—Young & Thompson (57) ABSTRACT

A camera with a magnetic recording device that may record optional data on a magnetic recording layer of a photo filmstrip while the photo filmstrip is advanced by one frame after each exposure. The optional data is print number data designating the number of copies to print from a picture frame and/or caption data designating a content and a language of a caption to print with a picture frame. The optional data is selectable by photographers for each picture frame by operating a multi-operation button when the camera is put in a mode set-up standby stage upon a shift switch being turned on by pushing a shift button. The multi-operation button is virtually divided into four sections. The camera is put in a print number setting mode when one of the sections that is provided with a mark indicating the print number setting mode, is pressed in the mode set-up standby stage. The camera is put in a caption setting mode when another section that is provided with a mark indicating the caption setting mode, is pressed in the mode set-up stage. The print number data or the caption data as selected in the print number setting mode or the caption setting mode is stored in a RAM, and read out from the RAM when the magnetic recording device records it on the magnetic recording layer.

10 Claims, 9 Drawing Sheets

CAMERA WITH MAGNETIC RECORDING DEVICE

BACKGROUND OF THE INVENTION

1. Field of the Invention

The present invention relates to a camera with a magnetic recording device for recording data on a photo film with a magnetic recording layer thereon, and more particularly to a camera which is compact and has improved handling for operating the magnetic recording device, especially for selecting data to record on the magnetic recording layer.

2. Background Arts

Recently, cameras often have an electric zoom lens and a variety of operation modes including different focusing modes and different flash modes. As the variety of operation modes is getting wider, the number of operation members for zooming and mode-setting is getting larger. On the other hand, since the zooming is the most frequent operation, zooming operation members should not be too small for ease of handling. To maintain a sufficiently large area or space for the zooming operation members, other mode set-up operation members have conventionally been made so small that the efficiency and handling facility in mode setting is unsatisfactory.

To solve this problem, U.S. Pat. No. 5,970,261, corresponding to JPA No. 10-142650, and JPA No. 10-142651 disclose a zoom camera with a multi-operation button that is used for zooming as operated solely, but also used for mode setting as operated in combination with a shift switch button. The multi-operation button is virtually divided into sections, and different operation modes are allocated to the individual sections. A mark indicating the allocated operation mode is provided on each section.

Meanwhile, a new type photo film cartridge, called IX240 type, has been developed and brought into market. The IX240 type contains a photo filmstrip having a magnetic recording layer formed thereon, so it is possible to record data magnetically on the photo film strip. Cameras for the IX240 type photo film cartridge have also been brought into market, which are mostly provided with a device for magnetically recording data on the photo filmstrip. For example, U.S. Pat. No. 5,893,000, corresponding to JPA No. 9-211677, and JPA No. 9-211678 disclose a camera that may record data on the magnetic recording layer, including data of a caption to print with a photographed picture, and data of how many copies to print from a picture frame. Such cameras are provided with a magnetic data set up device for allowing the user to designate the number of print copies, and choose content and language of the caption from among several options. However, in the conventional cameras with the magnetic data set up device, especially in multi-function compact cameras, it has been inconvenient for the user to set up data to record on the magnetic recording layer, because there are a lot of small operation members, such as small buttons, in a small space.

SUMMARY OF THE INVENTION

In view of the foregoing, a prime object of the present invention is to provide a camera with a magnetic recording device, which is compact and has improved handling for operating the magnetic recording device, especially for selecting data to record on the magnetic recording layer.

Another object of the present invention is to provide a camera with a magnetic recording device, in which operation for rewriting the magnetically recorded data is simplified.

To achieve the above object, according to the present invention, a camera with a magnetic recording device that may record optional data on a magnetic recording layer of a photo film, the optional data being selectable by photographers for each picture frame, comprises a switch for switching the camera between a first condition and a second condition; a push button member having a plurality of sections, wherein a different operating function is assigned to each of the sections in the first condition, and another different operating function is assigned to each of the sections in the second condition, and wherein, in the first condition, one of the sections is usable for putting the camera in an optional data setting mode, and while the camera is in the optional data setting mode, another one of the sections is usable for selecting optional data to record on the magnetic recording layer; a plurality of marks disposed in association with the sections of the push button member, for indicating the respective allocated operating functions; and a plurality of optical indication members allocated in one-to-one relationship to the sections of the push button member, and activated individually to take a different lighting state depending upon whether the camera is in the first condition or the second condition, and also whether the operating function assigned to the allocated section is currently available or not.

Since the marks show the operating functions allocated to the individual sections of the push button member, and the optical indication members indicate which of the sections are currently available for the allocated operating functions, the photographer can choose an appropriate operating function without fail by operating a corresponding one of the sections of the push button member.

According to a preferred embodiment, the camera is provided with a memory for storing optional data as selected in the optional data setting mode, and the magnetic recording device records the optional data read out from the memory on the magnetic recording layer. The magnetic recording device normally records the selected optional data in association with a picture frame while the photo film is advanced by one frame through a motor-driven film feeding device after photographing that picture frame. But if the same section as pressed for putting the camera in the optional data setting mode is pressed again in the optional data setting mode over a predetermined time duration, the magnetic data recording device records the selected optional data on the magnetic recording layer in association with a preceding picture frame photographed before selection of the optional data, and if any, in place of other optional data that has been recorded in association with the preceding picture frame. To enable the magnetic recording device to record data in association with the last or preceding picture frame, the photo filmstrip is conveyed by one frame in a reverse direction to a film advancing direction, and thereafter conveyed by one frame in the film advancing direction.

Since the camera moves to this rewriting stage if only the photographer presses the same section as used for putting the camera in the optional data setting mode again in the optional data setting mode for a predetermined time duration, there is no need for providing a specific operation member for rewriting.

The optional data may include first and second kinds of optional data. For example, the first kind of optional data is print number data designating the number of prints to produce from a picture frame, and the second kind of optional data is caption data designating a content and a language of a caption to print with a picture frame. In that case, the push button member is divided into at least three sections, and the camera is put in a first optional data setting mode responsive to a first one of the sections being pressed in the first condition, or in a second optional data setting mode responsive to a second one of the sections being pressed in the first condition. In the first or the second optional data setting mode, at least a third one of the sections is usable for selecting optional data of the first or the second kind respectively.

According to a preferred embodiment, depending upon whether the second section is initially pressed over a predetermined time duration in the first condition, the camera moves either to a language selecting stage or to a caption selecting stage of the second optional data setting mode, and the language of the caption is selectable by pressing the third section in the language selecting stage, whereas the content of the caption is selectable by pressing the third section in the caption selecting stage.

Thus, it becomes possible to select the language as well as the content of the caption to be recorded on the magnetic recording layer, by use of the same sections of the push button member in the second optional data setting mode. It is preferable to constitute the push button member of a single disc virtually divided into the sections; and a plurality switches, each being disposed under a respective one of the sections so as to be actuated by pressing the associated section. Thereby, the push button member can have a sufficiently large size for ease of handing.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein.

DETAILED DESCRIPTION OF THE PREFERRED EMBODIMENT

Figure 1:
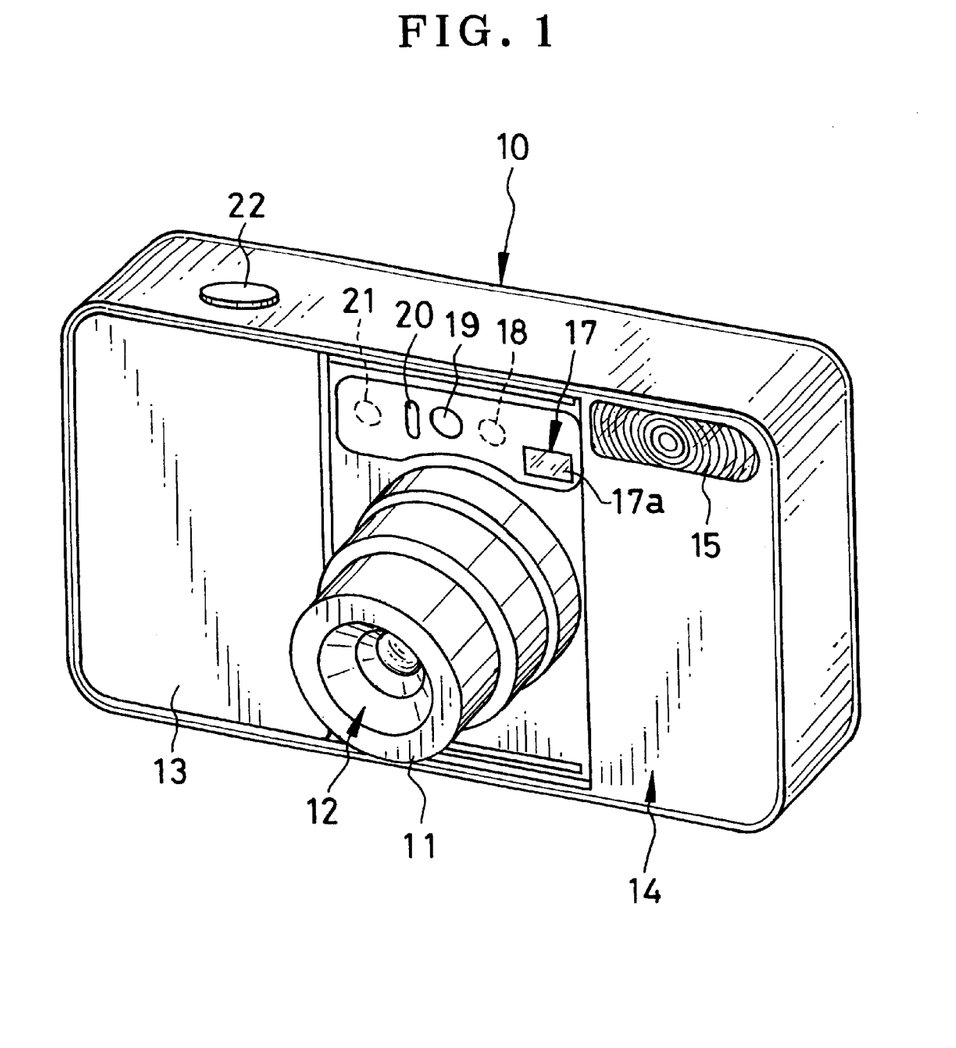
FIG. 1 is a perspective view of a compact zoom camera according to an embodiment of the invention.

In FIG. 1, a compact zoom camera 10 includes an electric zoom lens 12 whose lens barrels 11 can be completely stowed into a camera body 14. When the lens barrels 11 are stowed in the camera body, a lens barrier 13 is slid in front of the zoom lens 12 to close the same.

A flash projector 15 is provided in an upper front portion of the camera 10 on the opposite side of the lens barrier 13.

An objective window 17a of a viewfinder 17, a light emitting section 18 for active range finding of an autofocus module 37 (see FIG. 3), a light measurement section 19 for automatic exposure control, an LED 20 for self-timer photography, and a light receiving section 21 for the active range finding are disposed above the zoom lens 12. A shutter button 22 is mounted on a top portion of the camera body 14.

Figure 2:
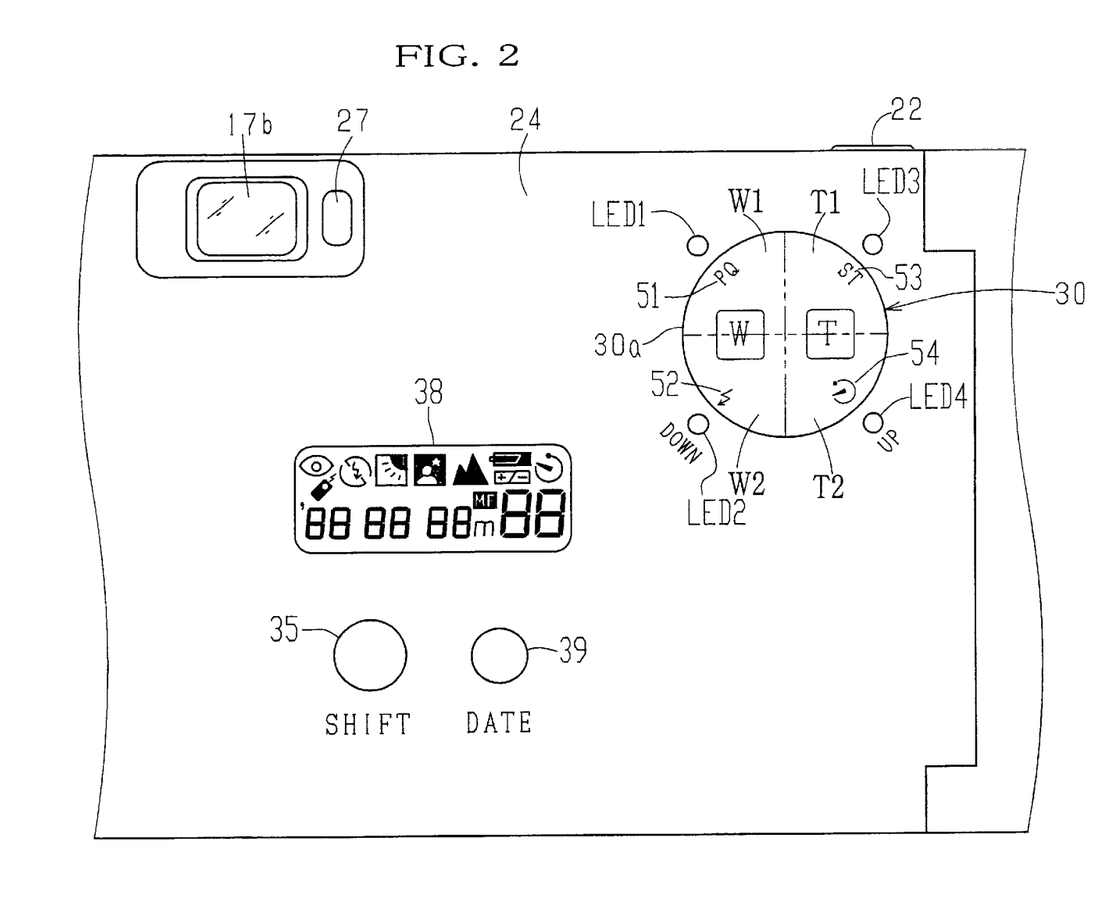
FIG. 2 is an explanatory view of a back side of the compact zoom camera of FIG. 1.

FIG. 2 shows a back side of the camera 10. An eyepiece 17b of the view finder 17 and an LED 27 are disposed in an upper left portion of a rear lid 24. The LED 27 is for indicating that the camera 10 is ready for exposure. A multi-operation button 30 is disposed in an upper right portion of the rear lid 24 so the photographer can operate the multi-operation button 30 by the right-hand thumb with ease while framing through the viewfinder 17. The multi-operation button 30 is operated for zooming as well as for mode setting.

Figure 3:
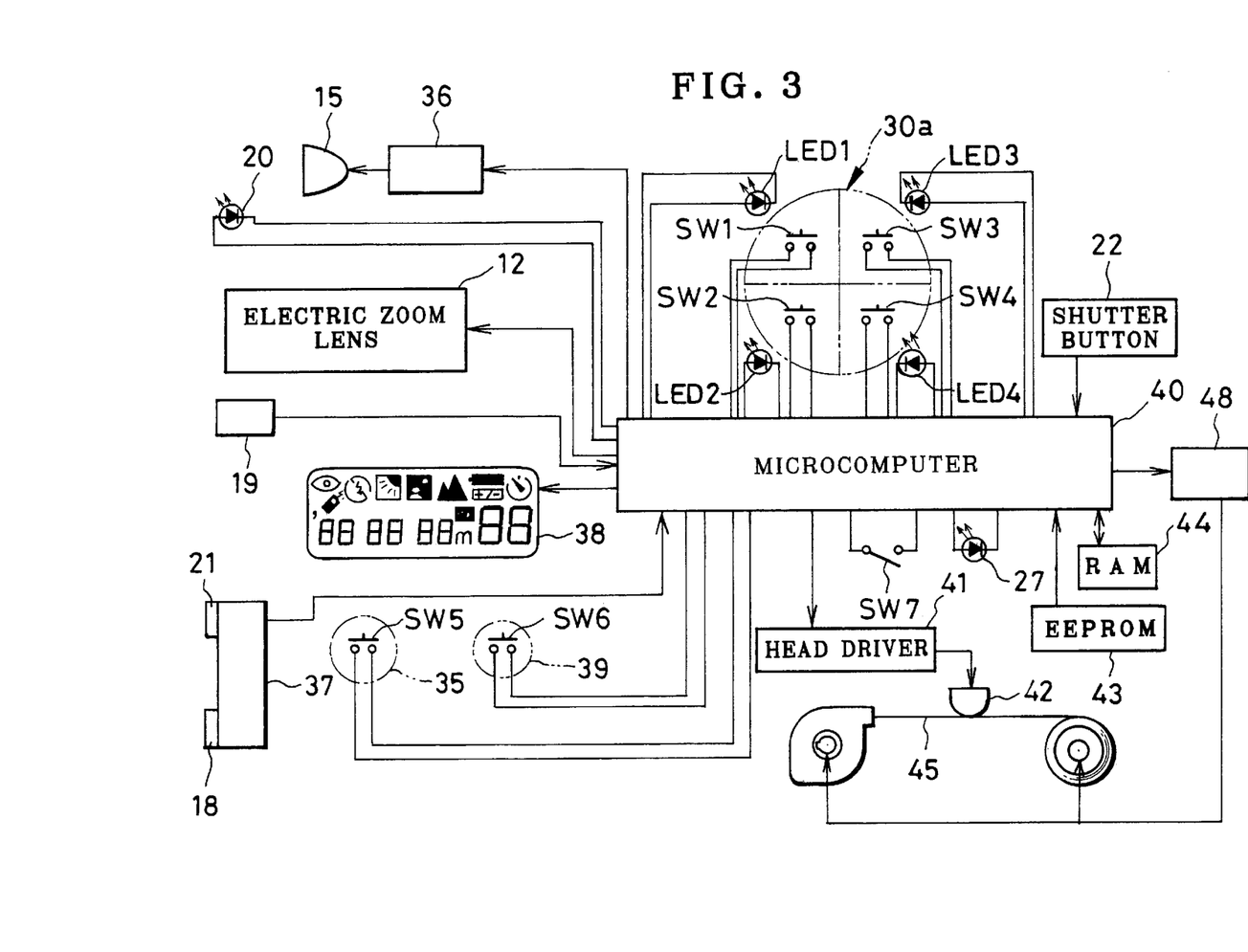
FIG. 3 is a schematic diagram illustrating electric control system of the compact zoom camera of FIG. 1.

As shown in FIG. 3, the multi-operation button 30 is constituted of a round switch disc 30a and four switches SW1, SW2, SW3 and SW4. The round switch disc 30a is virtually sectioned into quarter sectors W1, W2, T1 and T2, and the four switches SW1, SW2, SW3 and SW4 are disposed behind the sectors W1, W2, T1 and T2 respectively, so the f our switches SW1, SW2, SW3 and SW4 are individually turned on by pressing the corresponding sectors W1, W2, T1 and T2. When the user quits pressing any of the sectors W1, W2, T1 and T2, the switch disc 30a automatically returns to its initial position, turning off any of the four switches SW1, SW2, SW3 and SW4. That is, the switch SW1, SW2, SW3 or SW4 is in an OFF position when the corresponding sectors W1, W2, T1 or T2 is not pressed.

As will be described in more detail later, the switches SW1 and SW2 disposed behind the sectors W1 and W2 are used for zooming to the wide-angle side, whereas the switches SW3 and SW4 disposed behind the sectors T1 and T2 are used for zooming to the telephoto side. So indicia or marks for indicating the zooming direction, i.e. characters "W" and "T" in this embodiment, are provided on the disc 30c across the sectors W1 and W2, and across the sectors T1 and T2 respectively. Besides the characters "W" and "T", mode marks 51, 52, 53 and 54 are respectively provided on the sectors W1, W2, T1 and T2 to indicate the functions assigned to the sectors W1, W2, T1 and T2 for mode setting.

Four light emission diodes LED1, LED2, LED3 and LED4 are disposed around the multi-operation button 30 in correspondence with the four sectors W1, W2, T1 and T2. The LED1 to LED4 are turned on or off in accordance with a variety of mode setting operations that are effected while pressing a shift button 35. The shift button 35 is disposed in a lower portion of the rear lid 24, as shown in FIG. 2. Concurrently with the mode setting operation, necessary information is displayed on a liquid crystal display (LCD) panel 38 that is disposed above the shift button 35. A date switch button 39 is disposed beside the shift button 35. The date switch button 39 is pressed to adjust the date of a built-in clock or select a date display format on the LCD panel 38. Although the LCD panel 38 displays all potential information thereon in FIG. 2, this is not practical.

As shown in FIG. 3, a shift switch SW5 and a date switch SW6 are disposed behind the shift button 35 and the date switch button 39 respectively. Also a main switch SW7 for a power source of the camera 10 is disposed in proximity to the lens barrier 13, such that the main switch SW7 is turned on and off in cooperation with the lens barrier 13 being opened and closed respectively. These switches SW1 to SW7 are connected to a microcomputer 40.

To the microcomputer 40 is connected the electric zoom lens 12, the LEDs 20 and 27 and the LED1 to LED4. Also a flash device 36 having the flash projector 15, the autofocus module 37 having the light emitting section 18 and the light receiving section 21, the light measurement section 19, the shutter button 22 and the LCD panel 38 are connected to the microcomputer 40. Also a head driver 41 for a magnetic head 42, an EEPROM 43 and a RAM 44 are connected to the microcomputer 40. The EEPROM 43 stores a variety of data options that may be recorded on a magnetic recording layer formed on a photo filmstrip 45, whereas the RAM 44 temporarily stores those data read out from the EEPROM 43 to record on the magnetic recording layer. The microcomputer 40 drives the magnetic head 42 through the head driver 41 on the basis of the data stored in the RAM 44, so the data is recorded on the magnetic recording layer while the filmstrip 45 is advanced by one frame through a film feeding device 48. The film feeding device 48 is driven by a motor that is controlled by the microcomputer 40.

On the magnetic recording layer, basic photographic data, including the date of photography, is recorded for every picture frame. In addition to the basic photographic data, the user may record print number data for designating the number of copies to print from a picture frame in a print number setting mode, or data for designating a caption to print with a picture frame in a caption & language setting mode, as will be described in detail below.

Now, the operation of the multi-operation button 30 will be described in detail below.

Figure 4:
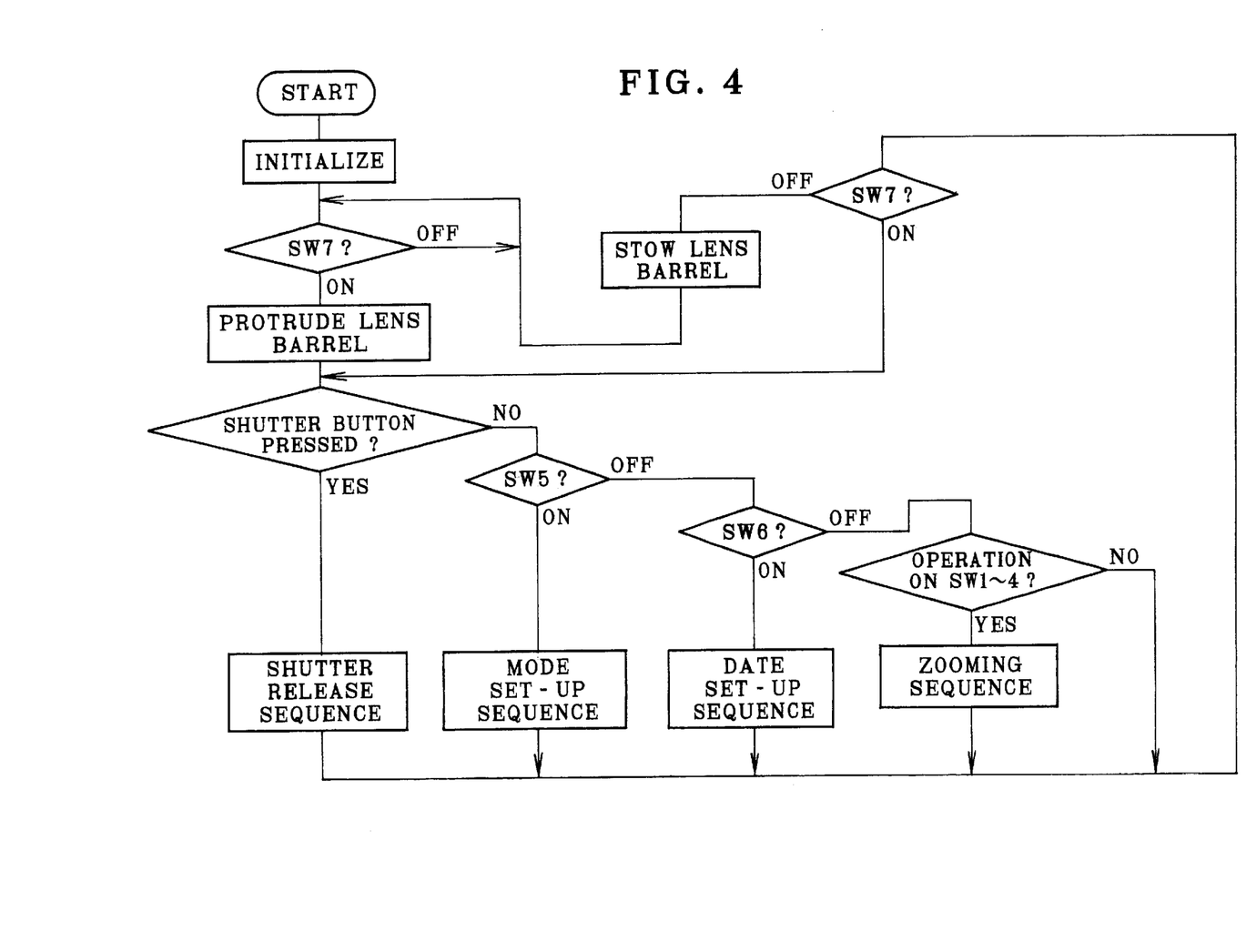
FIG. 4 is a flow chart illustrating an overall operation sequence of the electric control system of the camera.

As shown in FIG. 4, when the main switch SW7 is turned on by opening the lens barrier 13, the microcomputer 40 has been initialized to a default condition. Upon the main switch SW7 being turned on, the lens barrels 11 are protruded to a wide-angle terminal. In this initial stage, all of LED1 to LED4 are in the OFF state. Unless the shift button 35 or the date switch button 39 is pressed, all the LED1 to LED4 stay in the OFF state, and the multi-operation button 30 is used for zooming. That is, when the multi-operation button 30 alone is operated, the microcomputer 40 starts a zooming sequence. In the zooming sequence, the zoom lens 12 is caused to zoom toward a wide-angle terminal when at least one of the switches SW1 and SW2 is turned on by pressing the sector W1 or W2 or both, or toward a telephoto terminal when at least one of the switches SW3 and SW4 is turned on by pressing the sector T1 or T2 or both.

Figure 5:
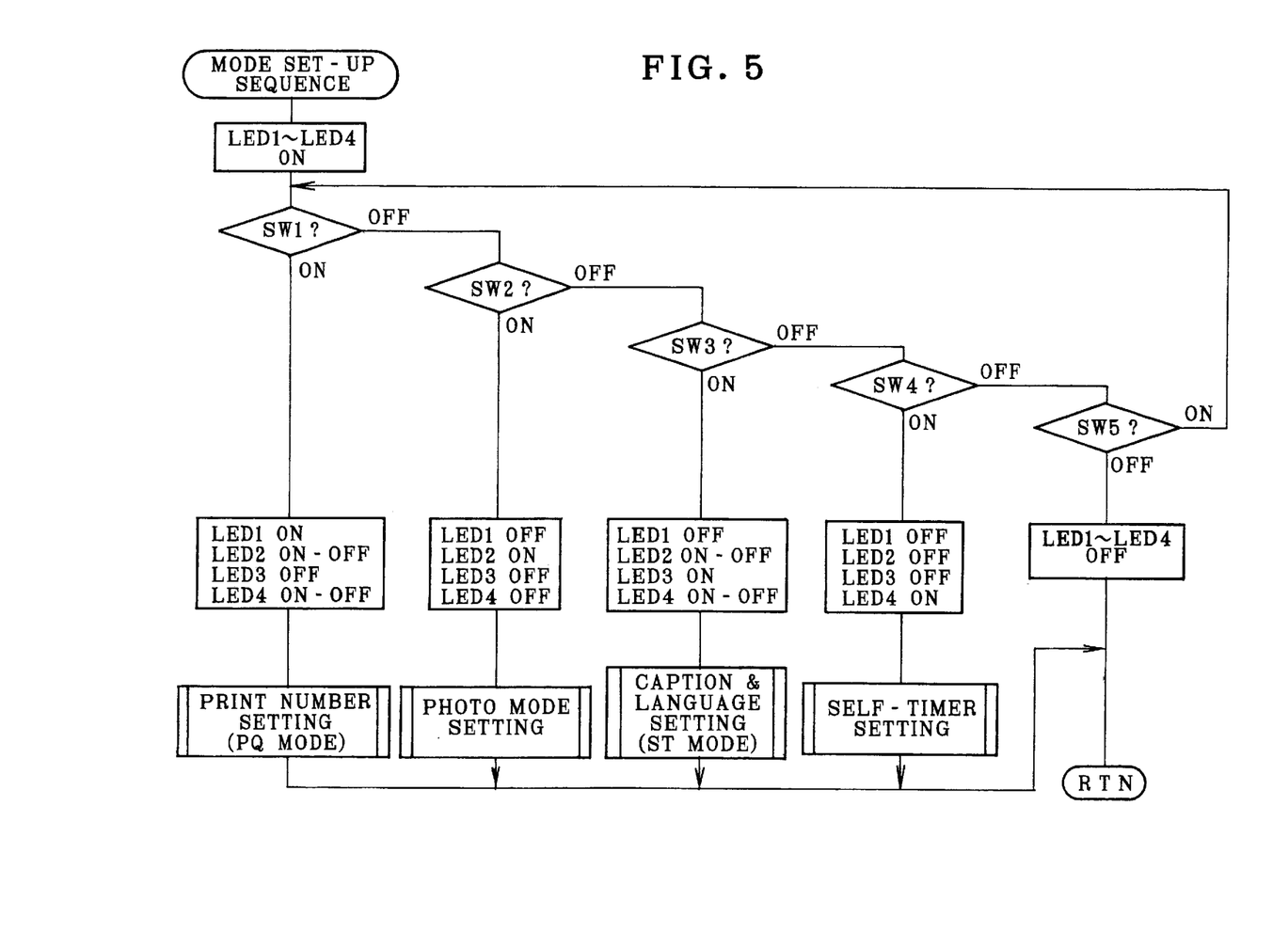
FIG. 5 is a flow chart of a mode set-up sequence continued from the flow chart of FIG. 4.
Figure 6A:
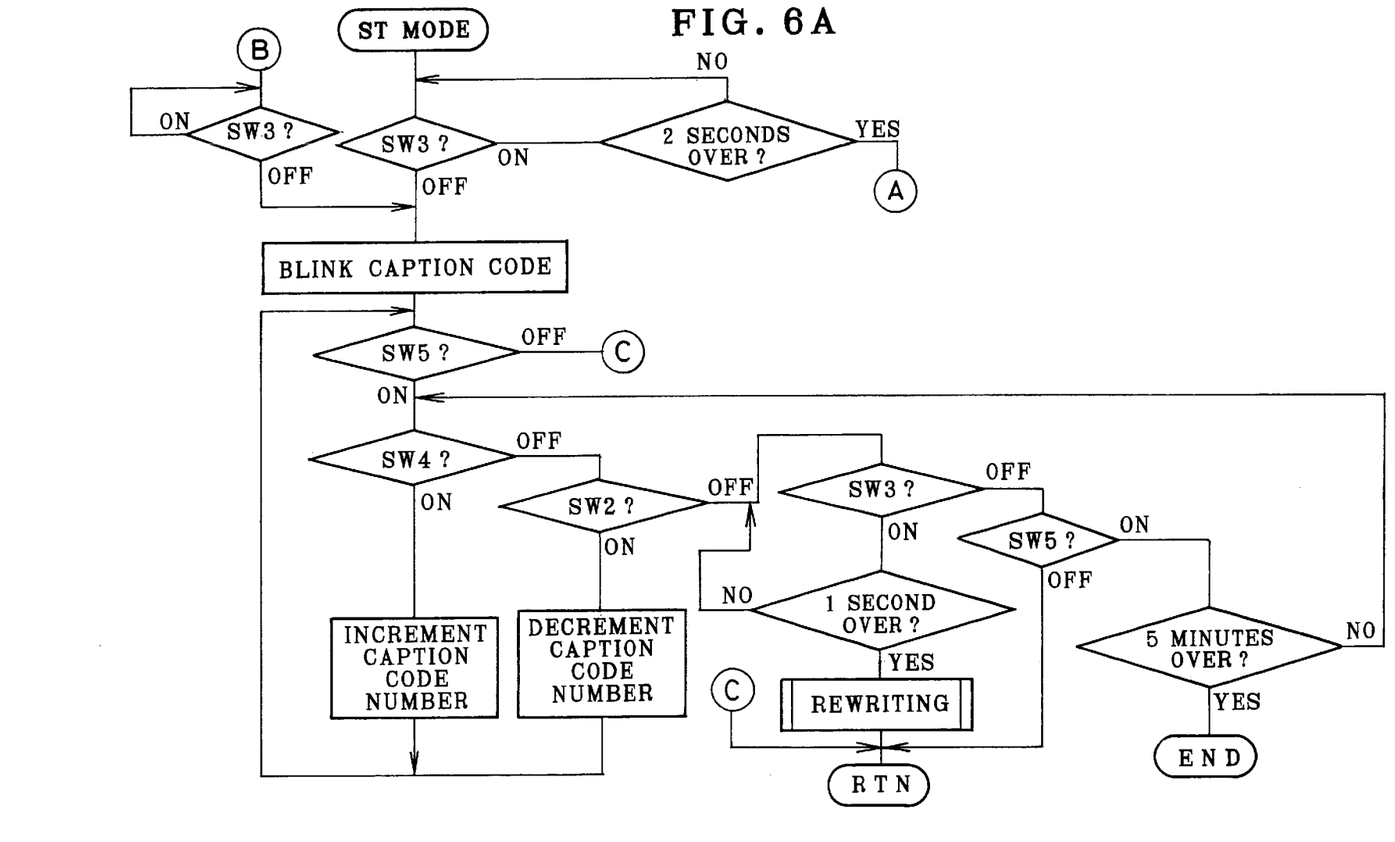
FIGS. 6A and 6B are a flow chart illustrating the operation of a caption & language setting mode (ST mode) continued from the flow chart of FIG. 5.
Figure 6B:
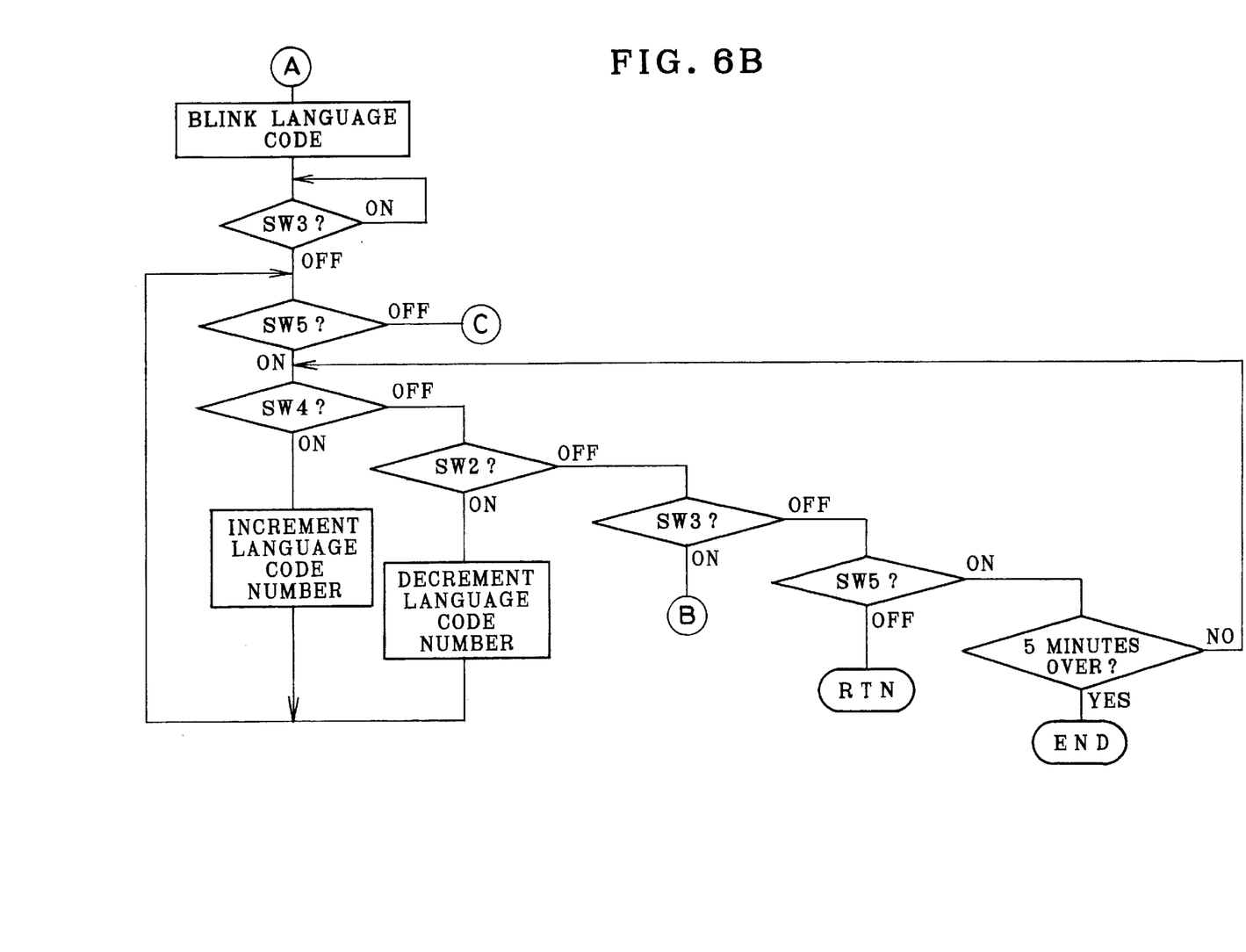

When the shift button 35 is pressed to turn on the switch SW5 in the above initial stage, the LED1 to LED4 are all turned on to indicate that the camera 10 moves to a mode setting standby stage of a mode set-up sequence as shown in FIG. 5. According to the present embodiment, the shift switch SW5 is maintained in the ON stage so long as the shift button 35 is pressed, so the shift button 35 should be kept pressed for continuing the mode set-up sequence. If the photographer quits pressing the shift button 35, the shift switch SW5 is turned off, and the camera 10 gets out of the mode set-up sequence. Then the LED1 to LED4 are all turned off, and the latest set-up condition is fixed.

If the sector W1 is pushed to turn on the switch SW1 in the mode setting standby stage, the camera 10 shifts to the print number setting mode, hereinafter called the PQ mode, where the number of copies to print from a picture frame may be designated. If the sector W2 is pushed to turn on the switch SW2 in the mode setting standby stage, the camera 10 shifts to a photo mode setting stage. If the sector T1 is pushed to turn on the switch SW3 in the mode setting standby stage, the camera 10 shifts to the caption & language setting mode, hereinafter called the ST mode, where a caption to print with a picture frame and its language may be designated. If the sector T2 is pushed to turn on the switch SW4 in the mode setting standby stage, the camera 10 shifts to a self-timer setting stage. To shift from one setting mode or stage to another setting mode or stage, the user turns off the shift switch SW5 by quitting pressing the shift button 35, and then presses the shift button 35 again to set the camera 10 in the mode setting standby stage. Thereafter, an appropriate one of the sectors W1, W2, T1 and T2 is to be pressed.

In the photo mode setting stage, the LED1, LED3 and LED4 are turned off, and the LED2 alone stays in the ON state, indicating that the sector W2 should be operated to select a photo mode. Each time the sector W2 is pushed, the camera 10 is shifted from one photo mode to another in a cyclic fashion, e.g. from an automatic flash mode to a red-eye prevention mode, to an on-flashing mode, to an off-flashing mode, to a landscape mode, to a nightscape mode, and again to the automatic flash mode. Synchronously with the photo mode shifting, an indicia indicating the presently selected photo mode is displayed on the LCD panel 38.

In the self-timer setting stage, the LED1 to LED3 are turned off, and the LED4 alone stays in the ON state, indicating that the sector T2 should be operated. Each time the sector T2 is pushed, the camera 10 is shifted from a self-timer off mode to a first self-timer mode, to a second self-timer mode, to a third self-timer mode, to a remote control mode, and again to the self-timer off mode in a cyclic fashion. When the camera 10 is put to the self-timer setting stage, a corresponding display is made on the LCD panel 38. Specifically, no mark is displayed in the self-timer off mode, and a remote control mark is displayed in the remote control mode, whereas a number "1", "2" or "3" is displayed in the first, the second or the third self-timer mode respectively, to indicate the number of those frames which are being exposed automatically in succession. However, if the available exposure number is less than three, the third self-timer mode is automatically skipped. When only one exposure is available, the second and third self-timer modes are skipped. In those cases, the display sequence on the LCD panel 38 is correspondingly modified.

If the user presses the sector T1 in the mode setting standby stage to select the ST (caption & language setting) mode, the LED1 is turned off, the LED2 and LED4 are turned to an ON-OFF state or blinking state, and the LED3 alone stays in the ON state. The ST mode will now be described in detail with reference to FIGS. 6A to 7C.

Figure 7A:
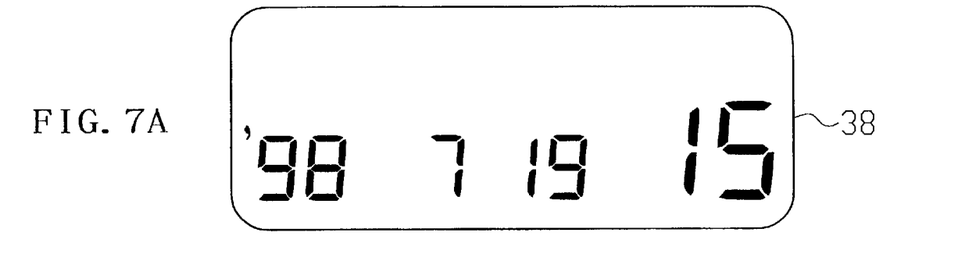
FIGS. 7A, 7B and 7C are explanatory views illustrating display conditions on an LCD panel in the ST mode.
Figure 7B:
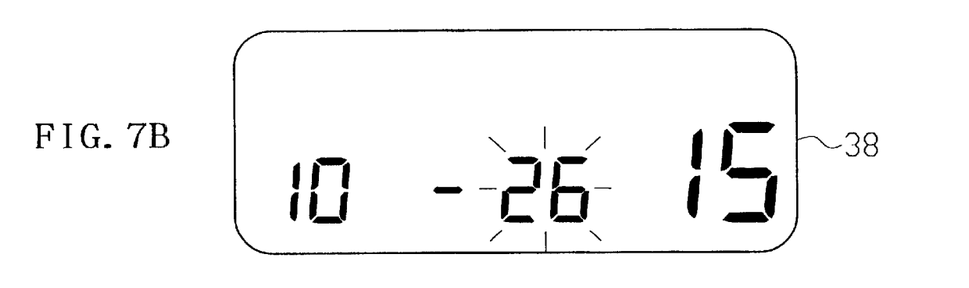
Figure 7C:
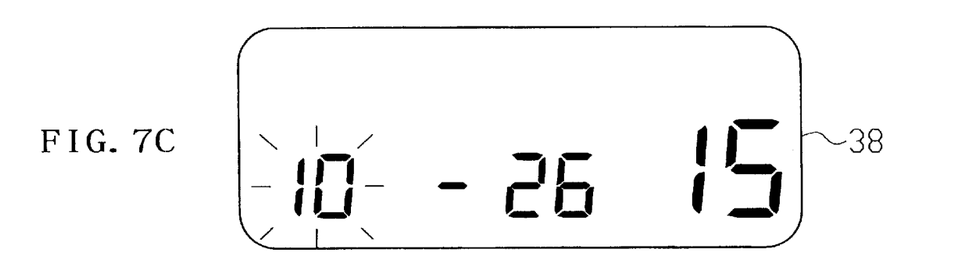

When the camera 10 is set to the ST mode, LCD panel 38 shifts from a standard display condition shown in FIG. 7A to a ST code display condition where a pair of numeric codes, e.g. "10–26" as shown in FIG. 7B, are displayed in place of the date data. It is to be noted that some information that may be displayed on the LCD panel 38 is omitted from FIGS. 7A to 7C for clarity shake. If the switch SW3 returns to the OFF state within 2 seconds by quitting pressing the sector T1 before 2 seconds have elapsed from the start of pressing the sector T1 in the mode set-up standby stage, e.g. "26" in this instance, starts blinking. The right side numeric code on the LCD panel 38 is a caption code representative of a content of a caption, so the blink of the caption code indicates that the camera 10 is in a caption selecting stage of the ST mode. On the other hand, the left side numeric code, e.g. "10" in this instance, is a language code representative of a language. If the switch SW3 is maintained in the ON state over 2 seconds, the language code starts blinking, as shown in FIG. 7C, to indicate that the camera 10 is in a language selecting stage of the ST mode. For example, blinking frequency of either code is 2 Hz.

Table 1 shows an example of correlation between the caption codes and contents of selectable captions. Table 2 shows an example of correlation between the language codes and selectable languages.

TABLE 1

| CODE | CONTENT |
| --- | --- |
| 00 | Christmas |
| 01 | Birthday |
| 02 | Vacation |
| 03 | Honeymoon |
| 04 | Wedding |
| 05 | - undefined - |
| 06 | Graduation |
| 07 | Family |
| 08 | Party |
| 09 | Holiday |
| 10 | Anniversary |
| 11 | Friend |
| 12 | School Event |
| 13 | - undefined - |
| 14 | I Love You |
| 15 | Thank You |
| 16 | - undefined - |
| 17 | Happy Birthday |
| 18 | Congratulation |
| 19 | Merry Christmas |
| 20 | Festival |
| 21 | School Entrance |
| 22 | Travel |
| 23 | New Year |
| 24 | Easter |
| 25 | Happy New Year |
| 26 | Class Reunion |
| 27 | Father's Day |
| 28 | Mother's Day |
| 29 | Memory |
| 30 | Baptism |
| 31~49 | - extendable - |

TABLE 2

| CODE | LANGUAGE |
| --- | --- |
| 01 | Danish |
| 02 | Finnish |
| 03 | French |
| 04 | German |
| 05 | Italian |
| 06 | Japanese 1 (Roman letter) |
| 07 | Japanese 2 (katakana) |
| 08 | Norwegian |
| 09 | Portuguese |
| 10 | Spanish |
| 11 | Swedish |
| 12 | U.K. English |
| 13 | U.S. English |
| 14~99 | - extendable - |

During the ST mode, the LED3 stays in the ON state, and the LED1 stays in the OFF state, whereas the LED2 and LED4 keep blinking unless their corresponding sectors W2 and T2 are pressed. While the sector W2 or T2 is pressed continuously to turn on the switch SW2 or SW4 in the ST mode, the associated LED2 or LED4 stops blinking and emits light continuously. As the switch SW2 or SW4 returns to the OFF state, the LED2 or LED4 restarts blinking in the ST mode.

In the caption selecting stage, the number of the caption code decrements one by one each time the sector W2 is pressed for a moment. If the sector W2 is kept pressed over 1 second or more, the number of the caption code decrements successively at interval of 250 ms until the user quits pressing the sector W2. After the number of the caption code comes down to "00", a non-caption code "--" is displayed instead, and thereafter a maximum number of the caption code, i.e. "30" in this instance, is displayed. In this way, the caption code number decrements cyclically in response to the depression of the sector W2. It is to be noted that the non-caption code "--" represents that no caption code is recorded on the filmstrip 45.

On the other hand, if the sector T2 is pressed in the caption selecting stage, the number of the caption code increments. After the number of the caption code reaches the maximum value, the non-caption code "--" is displayed, and then the number is reset to "00" and restarts incrementing in a cyclic fashion so long as the sector T2 is pressed. In this way, the user selects one of the predetermined captions by having the corresponding caption code displayed on the LCD panel 38.

In the language selecting stage, the number of the language code decrements cyclically one by one each time the sector W2 is pressed. That is, after the number of the language code comes down to "01", the language code is reset to a maximum number, i.e. "13" in this instance, and restarts decrementing upon each depression of the sector W2. On the other hand, if the sector T2 is pressed in the language selecting stage, the number of the language code increments cyclically. In this way, the user selects one of the predetermined languages by having the corresponding language code displayed on the LCD panel 38. In the language selecting stage, the LED3 and LED4 keep on blinking. If the user presses sector T1 again to turn on the switch SW3 for a moment and then turns it off in the language selecting stage, the camera 10 shifts to the caption selecting stage. Therefore, it is possible to set the camera 10 to the caption selecting stage to select a caption after selecting the language, only by pressing the sector T1 for a moment in the language selecting stage. Then the caption code starts blinking instead of the language code.

After selecting the caption and language codes on the LCD panel 38, the user quits pressing the shift button 35 to turn off the shift switch SW5. Thus, the ST mode is terminated, and all the LED1 to LED4 are turned off, whereas the selected language and caption codes are displayed without blinking on the LCD panel 38. Simultaneously, ST data representative of the presently displayed caption and language codes is written in the RAM 44. Then, a flag is set in a register of the microcomputer 40, to indicate that the ST data is written in the RAM 44.

If 5 minutes have passed without operation on any of the sectors W2, T1 and T2 of the multi-operation button 30 in the ST mode, and thus any of the switches SW2 to SW4 are in the OFF state for 5 minutes in the ST mode, or when the main switch SW7 is turned off by closing the lens barrier 13, the ST mode as well as the mode set-up sequence is canceled. Then the LED1 to LED4 are turned off, and the LCD panel 38 returns to the date display condition, and the lens barrel 12 automatically stowed. At that time, the ST data is written in the EEPROM 43. To put the camera 10 back to the initial stage after the lens barrel 12 is stowed because of the nonexistence of operation on the multi-operation button 30, the main switch SW7 is to be turned on after being turned off once, by closing the lens barrier 13 and then opening it again.

When the ST mode is terminated, all of the LED1 to LED4 are turned off, and the caption code and the language code displayed on the LCD panel 38 at that moment are written as ST data in the RAM 44. Each ST data is representative of a caption in a language, and is stored in a table memory location of the EEPROM 43 that is addressed by a pair of language code and caption code. Since data stored in the EEPROM 43 may be revised, the contents and the languages of the captions may be revised or extended appropriately.

Even after the ST data is written in the RAM 44, so long as any picture frame is not photographed thereafter, it is possible to revise the ST data by setting the camera 10 in the ST mode again, and selecting a new set of caption and language codes in the same way as described above. When a picture frame is photographed after the ST data is written in the RAM 44, the microcomputer 40 reads out the ST data from the RAM 44, and records it on the magnetic recording layer of the photo filmstrip 45 in association with the just photographed picture frame while the photo filmstrip 45 is advanced by one frame after the photography. As described above, the ST data is recorded in addition to the basic photographic data that is recorded at every picture frame. After the magnetic recording, the ST data is transferred from the RAM 44 to a work memory location of the EEPROM 43.

The ST data recorded on the magnetic recording layer may also be rewritten unless the next picture frame is photographed. To rewrite the ST data on the magnetic recording layer, the user sets the camera 10 to the ST mode. Then those language and caption codes which correspond to the last ST data recorded on the magnetic recording layer are displayed on the LCD panel 38 on the basis of the ST data read out from the work memory location of the EEPROM 43. Then, the user replaces the displayed caption or language code by a new one in the same way as set forth above with respect to the caption or the language setting stage. Thereafter, the user presses the sector T1 to turn on the switch SW3 over 1 second or more in the ST mode. Then the camera 10 proceeds to a rewriting stage, and ST data representative of a newly selected combination of language and caption codes is written in the RAM 44. In the rewriting stage, the film feeding device 48 conveys the photo filmstrip 45 in a reverse direction to the film advancing direction by one frame, while the magnetic head 42 erases the last recorded ST data from the magnetic recording layer. Thereafter the photo filmstrip 45 is moved again in the advancing direction by one frame, while the newly selected ST data is recorded on the just erased portion of the magnetic recording layer through the magnetic head 43.

Figure 8A:
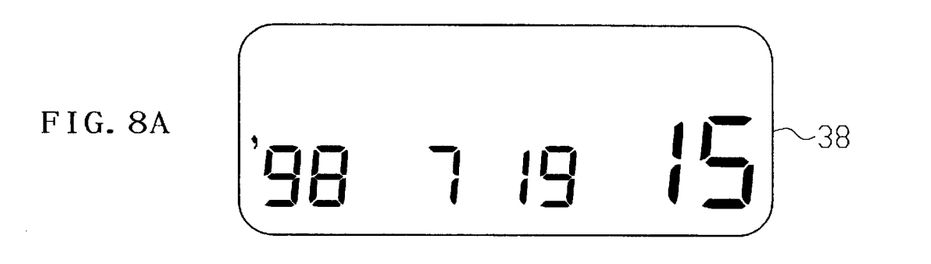
FIGS. 8A, 8B and 8C are explanatory views illustrating display conditions on the LCD panel in a print number setting mode (PQ mode).
Figure 8B:
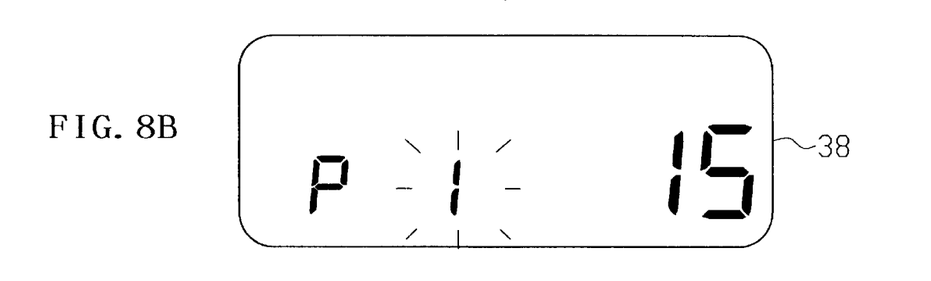
Figure 8C:
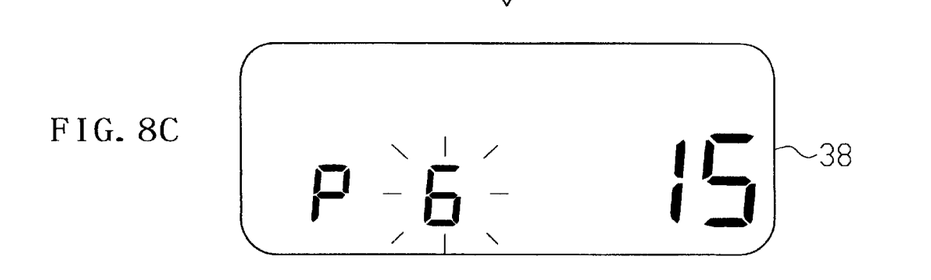

If the user presses the sector W1 in the mode setting standby stage to select the PQ (print number setting) mode, the LED1 alone stays in the ON stage, whereas the LED3 is turned off, and the LED2 and LED4 are turned to the blinking state. When the camera 10 is set to the PQ mode, LCD panel 38 shifts from the standard display condition shown in FIG. 8A to a default PQ mode display condition where "P 1" is displayed in place of the date data as shown in FIG. 8B, wherein the number adjacent to the character "P", i.e. "1" in the default PQ mode display condition, represents the print number per a picture frame. The print number is displayed in the blinking state in the PQ mode. Each time the sector T2 is pressed in the PQ mode, the print number increments one by one. In this embodiment, the user can designate at most ten copies from a picture frame, so the print number is reset to zero after it reaches the maximum value "10". On the contrary, by pressing the sector W2 in the PQ mode, the print number decrements one by one, and is reset to "10" after it reaches "0". Thus, the print number changes in a cyclic fashion upon depression of the sector T2 or W2.

When the shift switch SW5 is turned off by quitting pressing the shift button 35, the PQ mode is terminated, and the presently displayed print number is written as PQ data in the RAM 44. The PQ data is read out from the RAM 44, and is recorded on the magnetic recording layer of the photo filmstrip 45 in the same way as described with respect to the ST data, in addition to the basic photographic data that is recorded at every picture frame. After being magnetically recorded, the PQ data is transferred from the RAM 44 to the work memory location.

The PQ data written in the RAM 44 may also be revised by repeating the same PQ mode operation as above, unless any picture frame is not photographed after the selection of the print number. Also the PQ data recorded on the magnetic recording layer may be rewritten unless the next picture frame is photographed. To rewrite the PQ data on the magnetic recording layer, the user first sets the camera 10 to the PQ mode by pressing the sector W1, and selects another print number. If the user presses the sector W1 to turn on the switch SW1 over 1 second or more in the PQ mode, the camera 10 proceeds to a rewriting stage, so PQ data representative of a newly selected print number is written in the RAM 44, and the photo filmstrip 45 is moved back and forth to rewrite the PQ data on the magnetic recording layer in the same way as described with respect to the ST data. When rewriting ST data alone on the magnetic recording layer where both ST data and PQ data have been recorded, the microcomputer 40 reads out the previous PQ data from the EEPROM 43 and writes it in the RAM 44 again. Then, the new ST data and the previous PQ data are read out from the RAM 44, and is rewritten on the magnetic recording layer. In the same way, it is possible to rewrite PQ data alone after recording both PQ data and ST data on the magnetic recording layer.

Now, the overall operation of the camera 10 will briefly be described.

To take a photograph, the photographer opens the lens barrier 13, and frames a subject through the viewfinder 17. While framing the subject, the photographer may push by the right-hand thumb the sector T1 or T2 or both to zoom the zoom lens 12 to the telephoto side, or the sector W1 or W2 or both to zoom the zoom lens 12 to the wide-angle side. The microcomputer 40 reckons an ON signal from either of the switches SW1 and SW2 as a wide-angle zooming command, and an ON signal from either of the switches SW3 and SW4 as a telephoto zooming command. Since two adjacent sectors are served as a zooming operation area for one direction, the handling facility is improved.

To setup a particular mode, the shift button 35 is pressed in the initial stage where the multi-operation button 30 is not operated and none of the LED1 to LED4 is turned on. Responsive to the shift button 35 being pressed, all the LED1 to LED4 are turned on to indicate that the camera 10 moves in the mode setting standby stage. In the initial stage and the mode setting standby stage, the LCD panel 38 is in the standard display condition, as shown for example in FIG. 7A. Thereafter, one of the four sectors W1, W2, T1 and T2 is pushed while keeping pressing the shift button 35.

When the sector W1 is pushed at that time, the camera 10 moves in the PQ mode. When the sector W2 is pushed at that time, the camera 10 moves in the photo mode setting stage. When the sector T1 is pushed at that time, the camera 10 moves in the ST mode. When the sector T2 is pushed at that time, the camera 10 moves in the self-timer setting stage. Among the LED1 to LED4, the one that is correspondent to the pushed sector W1, W2, T1 or T2 stays in the ON state, while other LEDs turn to the OFF state or the blinking state, so that the photographer can visually confirm which sector of the multi-operation button 30 is pushed.

When the ST mode is selected by pressing the sector T1, the LED1 is turned off, the LED2 and LED4 are turned to the blinking state, and the LED3 alone stays in the ON state. Simultaneously, the LCD panel 38 displays the language and caption codes in place of the date data. The language and caption codes first displayed on the LCD panel 38 at the start of the ST mode, may be those selected at the preceding ST mode, or those predetermined or customized to be default values. If the user quits pressing the sector T1 to let the switch SW3 return to the OFF state within 2 seconds, the caption code starts blinking as shown for example in FIG. 7B. By pressing the sector W2 or T2 while keeping pressing the shift button 35 in this caption selecting stage, the number of the caption code changes. If the user continues pressing the sector T1 to keep the switch SW3 in the ON state over 2 seconds in the mode setting standby stage, the language code starts blinking. By pressing the sector W2 or T2 while keeping pressing the shift button 35 in this language selecting stage, the number of the language code changes. If the user presses sector T1 again in the language selecting stage while keeping pressing the shift button 35, the camera 10 shifts to the caption selecting stage.

After selecting the caption and language codes on the LCD panel 38, the user quits pressing the shift button 35 to turn off the shift switch SW5. Thus, the ST mode is terminated, and ST data representative of the presently displayed caption and language codes is written in the RAM 44. Then, a flag is set in a register of the microcomputer 40, to indicate that the ST data is written in the RAM 44.

If the user want to designate the number of copies to print from a picture frame, the user presses the sector W1 while pressing the shift button 35, to set the camera 10 to the PQ mode. Then, the LED1 alone stays in the ON stage, whereas the LED3 is turned off, and the LED2 and LED4 are turned to the blinking state. On the other hand, the LCD panel 38 displays the print number in place of the date data as shown in FIG. 8B. By pressing the sector T2 or W2 while keeping pressing the shift button 35, the print number displayed on the LCD panel 38 changes. After selecting the print number, the user quits pressing the shift button 35 to turn off the shift switch SW5. Thus, the PQ mode is terminated, and all the LED1 to LED4 are turned off, whereas the selected print number is displayed without blinking on the LCD panel 38. Simultaneously, PQ data representative of the presently displayed print number is written in the RAM 44, and a flag is set in the register of the microcomputer 40, to indicate that the PQ data is written in the RAM 44.

Thereafter when the shutter button 22 is pressed halfway, photometric data detected through the light measurement section 19 is processed in the microcomputer 40 to determine a shutter speed and a stop-aperture size. Also the zoom lens 12 is driven for focusing on the basis of subject distance data detected through the autofocus module 37. Thereafter when the shutter button 22 is pressed fully, a shutter is opened and then closed in accordance with the shutter speed and the stop-aperture size.

Then the film feeding device 48 is activated to advance the photo filmstrip 45 by one frame to wind up the exposed portion of the photo filmstrip 45. While the photo filmstrip 45 is advanced, the ST data and/or the PQ data is read out from the RAM 44, and is recorded on the magnetic recording layer of the photo filmstrip 45 in addition to the basic photographic data through the magnetic head 42. Simultaneously, the PQ data or the ST data is transferred from the RAM 44 to the EEPROM 43, and is stored in case for the rewriting.

When the photographer sets the camera 10 to the ST mode or the PQ mode again to reselect ST data or PQ data respectively, and then presses the sector T1 or W1 over 1 second in the PQ mode or ST mode respectively before taking the next picture frame, the camera 10 shifts to the rewriting stage. Then the photo filmstrip 45 is moved by one frame in the reverse direction to the film advancing direction and then moved by one frame again in the film advancing direction through the film feeding device 48. While the photo filmstrip 45 is moved in the film advancing direction at that time, the newly selected PQ or ST data is rewritten on the magnetic recording layer in place of the previously written PQ or ST data. It is of course possible to set up the PQ or ST data first after the related picture frame is photographed, and record it by setting the camera to the rewriting stage.

After all of available exposures are carried out, the photo filmstrip 45 is removed from the camera 10, and is forwarded to a photofinisher. In the photofinisher, the print number, and if any, the caption to print are determined with respect to the individual picture frames on the basis of the PQ data and the ST data recorded on the magnetic recording layer, with reference to previously provided lookup tables that correspond to Tables 1 and 2. Thus, the designated number of prints are made from each picture frame, and the selected caption is printed in the selected language on the back side of each printed copy of the designated picture frame.

Although the present invention has been described with respect the illustrated embodiment, the present invention is not limited to the embodiment as described so far.

Data optionally recorded on the magnetic recording layer of the photo filmstrip 45 is not limited to the PQ and ST data, but may be any other kinds of data.

Although the shift button 35 should be kept pressed in the above embodiment, it is possible to design such that the camera 10 is latched in the mode setting standby stage once the shift button 35 is pressed in the initial stage, and the latest setting condition is fixed when the shift button 35 is pressed for the second time. At that time, the shift switch SW5 may be alternately turned on and off upon each depression of the shift button 35, or may alternately output two kinds of signal upon each depression of the shift button 35 for switching the camera 10 between two different operating conditions. In that case, the photographer does not have to keep pushing the shift button 35 during the mode setting. It is also possible to use a lever or another type of switch operation member instead of the shift button 35.

The multi-operation button 30 as well as the shift button 35 may be located at any appropriate positions on the camera 10. The shape of the multi-operation button 30 is not limited to the illustrated embodiment. The number of available modes and the types of available modes are not limited to the above embodiment. Also, the number of sectors or sections of the multi-operation button can vary depending upon the number of the available modes or the number of necessary operating functions.

Although the LED1 to LED4 are arranged around the multi-operation button 30 in the above embodiment, it is possible to dispose one LED or another kind of light emitting element behind each section of the multi-operation button, while forming the switch disc 30a from a transparent material. Although the mode marks 51 to 54 for indicating the individual functions of the sections of multi-operation button 30 are provided on the switch disc 30*a* in the illustrated embodiment, they may be provided in proximity to the associated sections.

It is also possible to construct each section of the multi-operation button as a separate member, and arrange these separate members adjacent to one another.

Although the multi-operation button 30 is used for zooming while the shift switch SW5 is in the OFF state, it is possible to use the multi-operation button 30 for other operating functions when the shift button is not operated. For example, one of another set of operations modes may be selectable by operating the multi-operation button 30 solely. Thus, a wider variety of modes are made available through the operation of the multi-operation button and the shift switch in combination. Although the present invention has been described with respect to the zoom camera with the electric zoom lens, the present invention is applicable to a manual zoom camera and any other types of cameras.

Thus, the present invention should not be limited to the embodiments shown in the drawings, but on the contrary, various modifications may be possible to those skilled in the art without departing from the scope of claims as appended hereto.

What is claimed is:

1. A camera with a magnetic recording device that may record optional data on a magnetic recording layer of a photo film, said optional data being selectable by photographer for each picture frame, the camera comprising:

a switch for switching the camera between a first condition and a second condition;

a push button member having a plurality of sections, a different operating function being assigned to each of said section in said first condition, and another different operating function being assigned to each of said sections in said second condition, wherein, in said first condition, one of said sections is usable for putting the camera in an optional data setting mode, and another one of said sections is usable for selecting optional data to record on said magnetic recording layer while the camera is in said optional data setting mode;

a plurality of marks disposed in association with said sections of said push button member, for indicating the respective assigned operating functions; and a plurality of optical indication members, each being allocated to a respective one of said sections, and activated individually to take a different lighting state depending upon whether the camera is in said first condition or said second condition, and whether the operating function assigned to the allocated section is currently available or not;

wherein if said one section as used for putting the camera in said optional data setting mode is pressed again in said optional data setting mode over a predetermined time duration, the camera starts a rewriting operation where optional data as selected in said optional data setting mode is recorded on the magnetic recording layer in association with a last picture frame photographed before selection of said optional data, and if any, in place of other optional data that has been recorded in association with said last picture frame.

2. A camera as claimed in claim 1, further comprising a memory for storing optional data selected in said optional data setting mode, wherein said magnetic recording device records the optional data stored in said memory on the magnetic recording layer in association with a picture frame while a motor-driven film feeding device advances the photo film by one frame after photographing said picture frame, but in said rewriting operation, said magnetic data recording device erases the optional data in association with said last picture frame while said film feeding device conveys the photo film by one frame in a reverse direction to a film advancing direction and then writes replacement said optional data while conveying the film in the advancing direction.

3. A camera as claimed in claim 1, wherein one of said optical indication members that corresponds to said section for selecting optional data blinks in said optional data setting mode, to indicate that said section is expected to be pressed for selecting optional data.

4. A camera as claimed in claim 1, further comprising a display device, said display device displays a numerical value or a numeric code when the camera is put in said optional data setting mode, said numerical value or said numeric code being changed in a cyclic fashion responsive to said section for selecting optional data being pressed in said optional data setting mode, wherein the numerical value or the numeric code displayed at the end of said optional data setting mode is written in said memory as optional data to record on said magnetic recording layer.

5. A camera as claimed in claim 4, wherein said numeric code represents one of predetermined captions available for printing on a printed sheet of a picture frame, and data of contents and languages of said predetermined captions is previously stored in the camera.

6. A camera as claimed in claim 1, wherein said optional data includes first and second kinds of optional data, and said push button member is divided into at least three sections, wherein the camera is put in a first optional data setting mode responsive to a first one of said sections being pressed in said first condition, or in a second optional data setting mode responsive to a second one of said sections being pressed in said first condition, whereas at least a third one of said sections is usable for selecting optional data of said first or said second kind in said first or said second optional data setting mode respectively.

7. A camera as claimed in claim 6, wherein said first kind of optional data is print number data designating the number of copies to print from a picture frame, and said second kind of optional data is caption data designating a content and a language of a caption to print on a printed sheet of a picture frame.

8. A camera as claimed in claim 7, wherein depending upon whether said second section is initially pressed over a predetermined time duration in said first condition, the camera moves either to a language selecting stage or to a caption selecting stage of said second optional data setting mode, and the language of the caption is selectable by pressing said third section in said language selecting stage, whereas the content of the caption is selectable by pressing said third section in said caption selecting stage.

9. A camera as claimed in claim 8, wherein the camera shifts from said language selecting stage to said caption selecting stage responsive to said second section being pressed in said language selecting stage.

10. A camera as claimed in claim 1, wherein said push button member comprises:

a single disc virtually divided into said sections; and a plurality switches, each of said switches being disposed under a respective one of said sections so as to be actuated by pressing the associated section.

* * * * *